United States Patent
Cholleton et al.

(10) Patent No.: US 10,778,640 B1
(45) Date of Patent: Sep. 15, 2020

(54) DEEP NEURAL NETWORK GENERATION OF DOMAIN NAMES

(71) Applicant: VERISIGN, INC., Reston, VA (US)

(72) Inventors: Aubry Cholleton, Fribourg (CH); Andreas Fischer, Bienne (CH); Jean Hennebert, Thun (CH); Vincent Raemy, Fribourg (CH); Baptiste Wicht, Bonnefontaine (CH)

(73) Assignee: VERISIGN, INC., Reston, VA (US)

( * ) Notice: Subject to any disclaimer, the term of this patent is extended or adjusted under 35 U.S.C. 154(b) by 129 days.

(21) Appl. No.: 15/800,920

(22) Filed: Nov. 1, 2017

(51) Int. Cl.
| | |
|---|---|
| *H04L 29/12* | (2006.01) |
| *G06N 20/00* | (2019.01) |
| *G06F 16/35* | (2019.01) |
| *G06F 16/951* | (2019.01) |

(52) U.S. Cl.
CPC .......... *H04L 61/3025* (2013.01); *G06F 16/35* (2019.01); *G06F 16/951* (2019.01); *G06N 20/00* (2019.01); *H04L 61/1511* (2013.01)

(58) Field of Classification Search
None
See application file for complete search history.

(56) References Cited

U.S. PATENT DOCUMENTS

2019/0068551 A1* 2/2019 Bilsten ................ H04L 61/3025

OTHER PUBLICATIONS

Andrej Karpathy, "The Unreasonable Effectiveness of Recurrent Neural Networks", May 21, 2015, Retrieved from the Internet Oct. 30, 2017: http://karpathy.github.io/2015/05/21/rnn-effectiveness/, pp. 1-31.

* cited by examiner

*Primary Examiner* — Cai Y Chen
(74) *Attorney, Agent, or Firm* — MH2 Technology Law Group, LLP (57) ABSTRACT

Techniques for generating internet domain name suggestions using machine learning are presented. Some techniques include obtaining sets of domain names, each set of domain names including domain names that concern a selected topic, training machine learning algorithms, such that trained language models are produced, each trained language model concerning a different selected topic, obtaining a seed domain name, identifying a primary topic that the seed domain name concerns, applying to the seed domain name a trained language model of the trained language models that concerns the primary topic, such that a primary proposed domain name is produced, where the primary proposed domain name concerns the primary topic and includes the seed domain name and at least one of a prefix or a suffix, and offering to register the primary proposed domain name.

20 Claims, 3 Drawing Sheets

DEEP NEURAL NETWORK GENERATION OF DOMAIN NAMES

FIELD

This disclosure relates generally to internet domain names.

BACKGROUND

The domain name system ("DNS") is a hierarchical distributed naming system for resources provided by computer servers that are connected to the internet. It associates domain names to numeric internet protocol ("IP") addresses of internet resources, including resources managed by web hosting providers, which provide the web server computers that serve the web pages associated with domain names. The DNS thus allows computers and humans to access networked resources, including web pages, using names.

A DNS "registry" is an authoritative, master database of all domain names registered in a top-level domain or other domain in which domain names can be registered. A registry includes many hardware computer servers operably coupled to the internet. A registry keeps the master database and also generates a "zone file" that includes DNS resource records for the top-level domain, which allows computers to look up DNS records in the top-level domain from anywhere in the world. Internet users generally interact with the registry via intermediaries. For ease of discussion, a registry is identified with its hardware computer servers unless otherwise specified or clear from context.

A "domain investor" is an internet user that purchases a domain name with the intent to later resell it at a higher price. That is, domain investors are interested in selecting domain names that will have a high resale value.

SUMMARY

According to some embodiments, a method of generating internet domain name suggestions using machine learning is presented. The method includes obtaining, using at least one electronic processor, a plurality of sets of domain names, each set of domain names including domain names that concern a selected topic; training, using at least one electronic processor, a plurality of machine learning algorithms, each machine learning algorithm trained by a different set of domain names of the plurality of sets of domain names, such that a plurality of trained language models is produced, each trained language model concerning a selected topic; obtaining a seed domain name; identifying, using at least one electronic processor, a primary topic that the seed domain name concerns; applying to the seed domain name, using at least one electronic processor, a trained language model of the plurality of trained language models that concerns the primary topic, such that a primary proposed domain name is produced, where the primary proposed domain name concerns the primary topic, and where the primary proposed domain name includes the seed domain name and at least one of a prefix or a suffix; and offering to register the primary proposed domain name.

Various optional features of the above embodiments include the following. Each set of domain names may include domain names that concern a selected topic and a business type; where the training may include training each machine learning algorithm by a different set of domain names of the plurality of sets of domain names, such that a plurality of trained language models is produced, each trained language model concerning a selected topic and a business type; the method may further include identifying a proposed business type; where the applying to the seed domain name a trained language model may include applying to the seed domain name a trained language model that concerns the topic and that concerns the proposed business type, where the primary proposed domain name concerns the topic and the proposed business type. The method may include appending a stop character at the end of each domain name in each of the plurality of sets of domain names prior to the training, where the proposed domain name includes at least one suffix. The method may include prepending a stop character at the beginning of each domain name in each of the plurality of sets of domain names prior to the training, where the proposed domain name includes at least one prefix. The method may include obtaining a plurality of training domain names and their associated topics; and training a machine learning algorithm with the plurality of training domain names and their associated topics, such that a classification model is produced; where the obtaining a plurality of sets of domain names, each set of domain names including domain names that concern a selected topic includes: obtaining a plurality of unlabeled domain names; applying the classification model to the plurality of unlabeled domain names; and grouping the plurality of unlabeled domain names according to classification by the classification model, such that the plurality of sets of domain names are produced. The plurality of unlabeled domain names may include a Domain Name System (DNS) zone file filtered to remove at least Punycode domains. The obtaining a plurality of training domain names and their associated topics may include crawling the world wide web to the plurality of training domain names and retrieving metadata representative of the associated topics. The identifying a primary topic that the seed domain name concerns may include providing the seed domain name to the classification model, and obtaining the primary topic from the classification model. The classification model may further output a secondary topic that the seed domain name concerns; and the method may further include applying to the seed domain name, using at least one electronic processor, a trained language model of the plurality of trained language models that concerns the secondary topic, such that a secondary proposed domain name is produced, where the secondary proposed domain name concerns the secondary topic, and where the secondary proposed domain name includes the seed domain name and at least one of a prefix or a suffix. The obtaining a seed domain name may include: providing a web page for suggesting domain names; accepting an input from a web page visitor; and providing the seed domain name in response to the input.

According to some embodiments, a system for generating internet domain name suggestions using machine learning is presented. The system includes an electronic persistent storage storing a plurality of sets of domain names, each set of domain names including domain names that concern a selected topic; at least one electronic processor configured to train a plurality of machine learning algorithms, each machine learning algorithm trained by a different set of domain names of the plurality of sets of domain names, such that a plurality of trained language models is produced, each trained language model concerning a selected topic; and at least one electronic processor configured to obtain a seed domain name; at least one electronic processor configured to identify a primary topic that the seed domain name concerns; at least one electronic processor configured to apply to the seed domain name a trained language model of the plurality of trained language models that concerns the primary topic, such that a primary proposed domain name is produced, where the primary proposed domain name concerns the primary topic, and where the primary proposed domain name includes the seed domain name and at least one of a prefix or a suffix; and at least one electronic processor configured to offer to register the primary proposed domain name.

Various optional features of the above embodiments include the following. Each set of domain names may include domain names that concern a selected topic and a business type; where the at least one electronic processor configured to train a plurality of machine learning algorithms may be further configured to train each machine learning algorithm by a different set of domain names of the plurality of sets of domain names, such that a plurality of trained language models is produced, each trained language model concerning a selected topic and a business type; and where the at least one electronic processor configured to obtain a seed domain name may be further configured to identify a proposed business type; where the at least one electronic processor configured to apply to the seed domain name a trained language model may be further configured to apply to the seed domain name a trained language model that concerns the topic and that concerns the proposed business type, where the primary proposed domain name concerns the topic and the proposed business type. The at least one electronic processor configured to train a plurality of machine learning algorithms may be further configured to append a stop character at the end of each domain name in each of the plurality of sets of domain names prior to the training, where the proposed domain name includes at least one suffix. The at least one electronic processor configured to train a plurality of machine learning algorithms may be further configured to prepend a stop character at the beginning of each domain name in each of the plurality of sets of domain names prior to the training, where the proposed domain name includes at least one prefix. The system may include an electronic persistent storage storing a plurality of training domain names and their associated topics; and at least one electronic processor configured to train a machine learning algorithm with the plurality of training domain names and their associated topics, such that a classification model is produced; where the plurality of sets of domain names are obtained by: obtaining a plurality of unlabeled domain names; applying the classification model to the plurality of unlabeled domain names; grouping the plurality of unlabeled domain names according to classification by the classification model, such that the plurality of sets of domain names are produced; and storing the plurality of sets of domain names in electronic persistent memory. The plurality of unlabeled domain names may include names from a Domain Name System (DNS) zone file filtered to remove at least Punycode domains. The plurality of training domain names and their associated topics may be obtained by crawling the world wide web to the plurality of training domain names and retrieving metadata representative of the associated topics. The at least one electronic processor configured to identify a primary topic that the seed domain name concerns may be configured to apply the classification model to the seed domain name. The classification model may be configured to output a secondary topic that the seed domain name concerns; and the system may further include at least one electronic processor configured to apply to the seed domain name a trained language model of the plurality of trained language models that concerns the secondary topic, such that a secondary proposed domain name is produced, where the secondary proposed domain name concerns the secondary topic, and where the secondary proposed domain name includes the seed domain name and at least one of a prefix or a suffix. The system may include a web page configured to accept an input from a web page visitor and provide the seed domain name in response to the input.

Disclosed embodiments provide many advantages over the prior art. Some embodiments generate domain names that are more focused on an individual's needs and interests than those that are selected or generated by other techniques. Some embodiments have the ability to capture deep contextual relationships at the character-level. These and other advantages are disclosed herein.

BRIEF DESCRIPTION OF THE DRAWINGS

Various features of the embodiments can be more fully appreciated, as the same become better understood with reference to the following detailed description of the embodiments when considered in connection with the accompanying figures, in which.

DESCRIPTION OF THE EMBODIMENTS

Reference will now be made in detail to example implementations, illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

Some embodiments include techniques for generating and presenting to a user, such as a domain investor or other individual, one or more domain names that are available for registration. The suggested domain names may be similar to a domain name in which the user previously expressed interest, e.g., by requesting to register it. The suggested domain names may be obtained by using one or more models trained by machine learning techniques. The models can be used generatively to add prefixes and/or suffixes to the requested domain name to produce novel domain names. The generated names can be filtered to remove any already-registered domain names, and the results output to a user for inspection, possible registration, or other uses.

According to some embodiments, the suggested domain names may be specific to a topic and/or business type, which may be automatically inferred from the domain name that the user requested for registration. Such embodiments may utilize a plurality of models, e.g., one model per topic and business type pair of values. Thus, some embodiments take as input a domain name of interest and, possibly, one or both of a topic of interest and a business type, which may be inferred from the domain name of interest itself, and produce as an output one or more novel domain names that concern the topic and/or business type and that are not currently registered. These and other features are described in detail herein.

Figure 1:
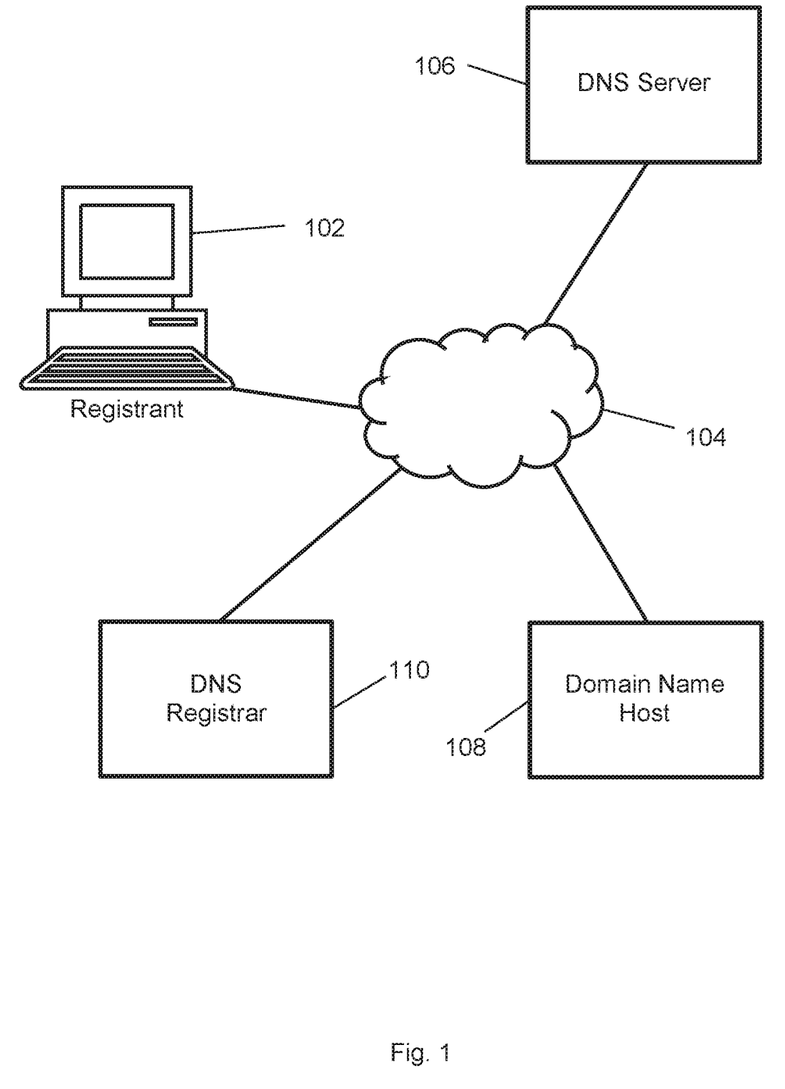
FIG. 1 is a schematic diagram illustrating a portion of the domain name system ("DNS") according to some embodiments.

FIG. 1 is a schematic diagram illustrating a portion of the domain name system ("DNS") according to some embodiments. As depicted in FIG. 1, a domain name (e.g., www.example.com) can be registered to an internet user known as a "registrant" 102 by a company known as a "registrar" 110. In general, registrars compete with one another to register domain names for registrants. An internet user interacts with a registrar 110 through the internet 104 to purchase, or "register", a domain name, thereby becoming a registrant 102 for that name. The registrar 110 asks the registrant 102 to provide various contact and technical information for the registration. The registrar 110 then keeps a record of the contact information and submits the technical information to the DNS registry (not shown).

When any internet user (not shown) attempts to navigate his or her browser to the registered domain name through internet 104, the browser contacts a DNS server 106, which provides an IP address for the domain name host 108 of the registered domain by looking up an appropriate DNS resource record for the domain name. The internet user's browser then navigates to the domain name host 108 using its IP address to retrieve the resource of the domain name, e.g., content.

For ease of discussion, a registrar is identified with its hardware computer servers unless otherwise specified or clear from context. Further, an internet user has a hardware client computer. For ease of discussion, a user is identified with the user's computer, and a registrant (e.g., registrant 102) is identified with his or her hardware client computer unless otherwise specified or clear form context.

Figure 2:
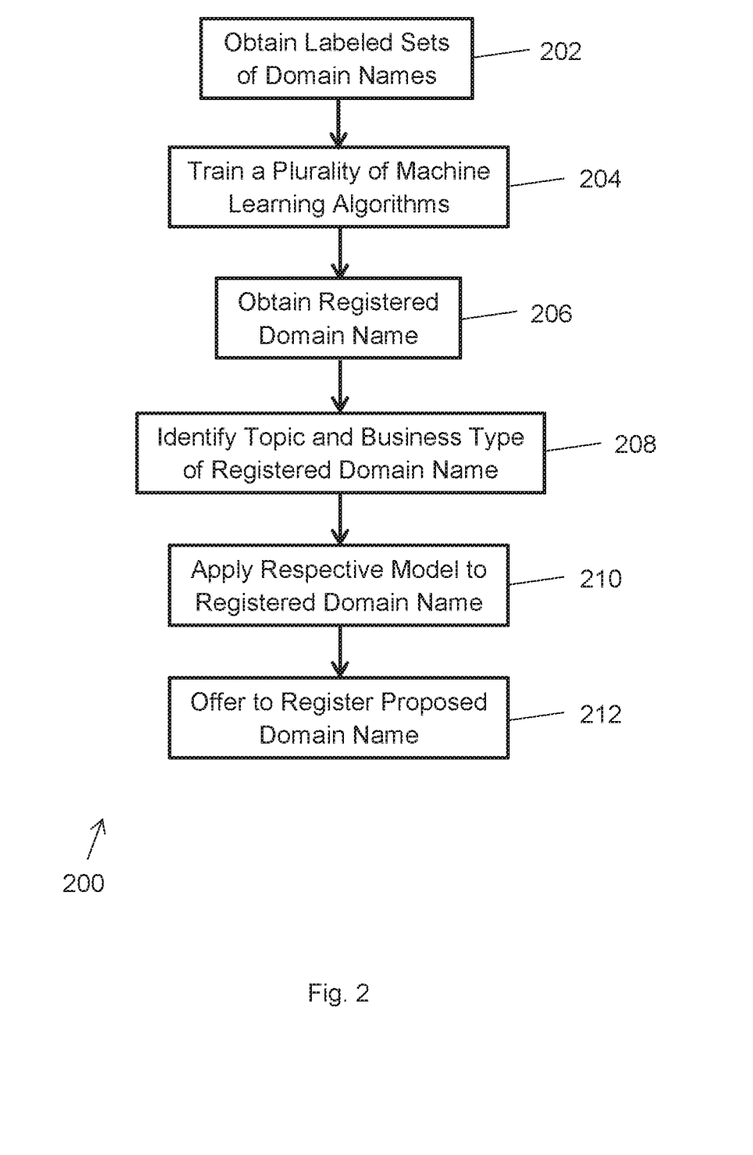
FIG. 2 is a flow diagram of a method according to some embodiments.

FIG. 2 is a flow diagram of a method 200 according to some embodiments. The method of FIG. 2 may be implemented by the system 300 shown and described below in reference to FIG. 3. Method 200 may be used to generate one or more domain name suggestions, starting from any arbitrary "seed" domain name, which may be registered. The generated domain names may be produced according to machine learning techniques so as to relate to, or concern, a topic of interest and/or a business type in which a user has expressed interest. The generated domain names may be produced by appending a suffix, and/or prepending a prefix, to the seed domain name. Details of example embodiments are disclosed presently.

At block 202, method 200 obtains a plurality of labeled sets of domain names. Each such labeled set will serve as a training corpus for a machine learning algorithm with respect to a particular topic and/or business type, as disclosed below in reference to block 204. The sets of domain names may be obtained as follows, by way of non-limiting example. Initially, method 200 may obtain a portion of a DNS zone file, an entire DNS zone file, or even a plurality of DNS zone files. The domain names from the one or more zone files may then be extracted, filtered, and categorized into individual sets of domain names. An initial step is that domain names that are not amenable to computer learning techniques as disclosed, such as Punycode domain names, may be filtered out (i.e., removed).

Next, the domain names are organized by topic and/or business type. Example topics include, by way of non-limiting example, cars, food, clothing, technology, relationships, etc. Example business types include, by way of non-limiting example, small business, medium business, large business, personal website, blog, etc. Note that a domain name may be categorized into more than one set simultaneously. The categorization may be accomplished in any of a variety of ways. According to some embodiments, a web crawling process navigates to the web sites of the domain names and extracts metadata therefrom. (Starting with a zone file ensures that the domain names are registered, and therefore likely to have an associated website.) Such metadata may indicate a topic and/or business type, and the domain names may be sorted accordingly. According to some embodiments, a commercial service that associates domain names with topics and/or business types may be used. According to some embodiments, a machine learning technique, such as that shown and described below in reference to block 208 may be used. According to some embodiments, a resource such as a phone book (e.g., YELLOWPAGES) may be used to associate domain names with their respective topic. According to some embodiments, crowdsourcing may be used to classify the domain names. According to some embodiments, a combination of the aforementioned techniques, or yet other technique, may be used to categorize the initial set of filtered domain names.

Once the domain names are categorized, the labels may be applied so as to indicate the particular topic and/or business type that each individual domain name concerns. The domain names may be labeled using any of a variety of techniques. For example, the labels may be appended to the domain names, directly associated with the domain names (e.g., by way of an indication in a database column, where each row represents a separate domain name), or indirectly associated with the domain names (e.g., by being associated with separate tables in a database, one table of domain names per topic and/or business type).

Once categorized and labeled, the domain names may be formatted for use in a machine learning algorithm. Such formatting may include stripping top-level domain names, for example. The formatting may include representing the domain names as vectors, e.g., rows in a database table, if not already so formatted. The domain names may be represented as vectors by representing individual characters as "one-hot" vectors of a length equal to the size of the character alphabet (inclusive any special stop character symbol, as described presently). A stop character may be appended at the end of the domain name. The stop character may be selected so as to not be permitted to appear in registered domain names. For example, the pipe character "|" may be used, as it is not in the character-space from which domain name strings are composed. Such a stop character may be processed by the machine learning algorithm to mark the end of a domain name. Such a technique is particularly suitable for embodiments that use machine learning techniques to add prefixes to domain names.

Some embodiments may further format the domain names for use with machine learning algorithms that are configured to add prefixes (as opposed to suffixes) to a seed domain name. For such embodiments, a duplicate copy of the categorized sets of domain names may be produced, and each name in the copy reversed, e.g., so that "verisign" would be reversed as "ngisirev". A stop character may be added at the end of such strings. Such sets of reversed, filtered, and categorized domain names may be used to train models, which may subsequently be used to generate domain name prefixes.

The result of the actions of block 202 is that method 200 electronically stores in persistent memory (e.g., persistent memory 312 of FIG. 3) a plurality of sets of domain names, categorized and labeled according to topic and/or business type. After the actions of block 202, control passes to block 204.

At block 204, method 200 trains a plurality of machine learning algorithms, using the sets of domain names obtained at block 202, to generate a plurality of corresponding electronically represented and stored models. According to some embodiments, machine learning algorithms that produce language models are employed. Such language models may learn the language, or "vocabulary", of each training corpus of domain names. In general, a language model may be defined by any prescribed known vocabulary, and this vocabulary can be constrained across multiple dimensions to be as specific or as broad as needed. In the present instance, the known vocabularies are the vocabularies of the filtered and categorized domain names.

Suitable machine learning algorithms include, by way of non-limiting example, neural networks, such as recurrent neural networks, feed-forward neural networks, and long-short term memory neural networks. These example neural network machine learning algorithms share similar multi-level configurations. In each case, the network is composed of an "input layer" of nodes equal to the size of the character alphabet (and therefore the one-hot vectors), one or more "hidden layers" of nodes, and a final "output layer" of nodes equal in size to the input layer. The hidden layers, by design, may not have the capacity to store or reproduce exactly what was presented in the input. Instead, they abstract and capture generalized properties of the input language at the character-sequence level. At an extremely high level, it is the responsibility of the hidden layers per the learning algorithm chosen, to be provided a character (on the input layer) and predict the next character in the sequence (on the output layer). This predictive capability is accumulated by observing the character sequences (and broader context) present in the training corpuses of domain names obtained per block 202. When processing elements, the internal structure of the networks may be updated to reinforce and/or forget their predictive pathways. Collectively, the networks form a plurality of learned language models, e.g., one per topic and business type pair.

Per block 204, according to some embodiments, two models are produced for each topic and business type pair of values, namely, a "forward" model and a "backward" model. Each forward model may be trained as described above, by using the filtered categorized domain names as training corpuses. Each backward model may be trained using a respective reversed and filtered set of domain names in a respective category (e.g., a category may be defined by a topic and business type pair). The backward models may be used per block 210 to generated prefixes for domain names as described below. Note that some embodiments utilize a single, bidirectional, language model for each topic and business type pair, but with different parameters according to whether the model is used to generate prefixes or suffixes.

Figure 3:
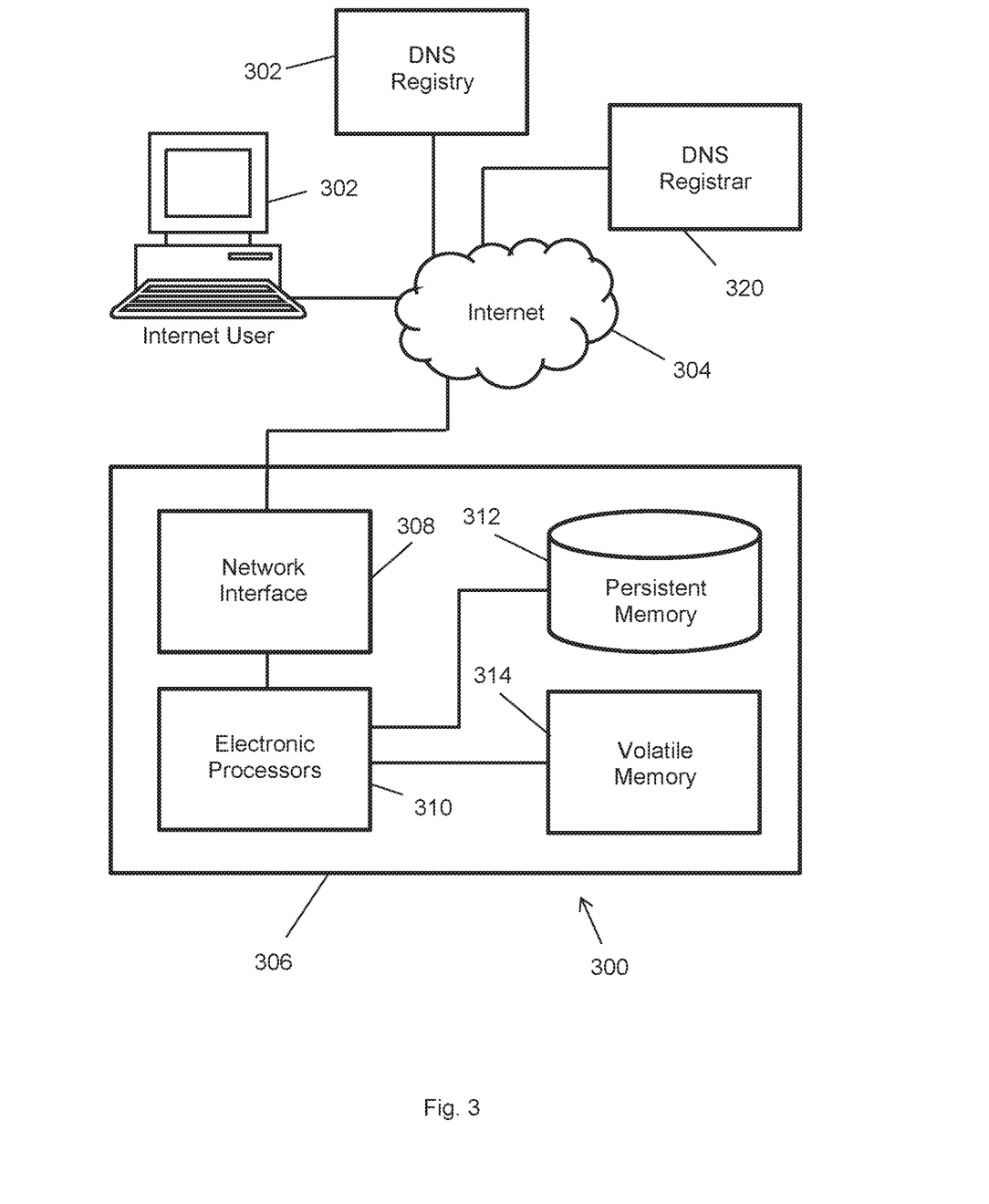
FIG. 3 is a schematic diagram of a system suitable for implementing methods according to some embodiments.

The result of the actions of block 204 is an electronically stored set of trained language models, one (or two: forward and reverse) for each topic and business type pair of values. The models may be stored in persistent memory, e.g., persistent memory 312 of system 300. After the actions of block 204, control passes to block 206.

At block 206, method 200 obtains a domain name, which may be registered. The obtained domain name will be used as a seed domain name to which prefix(es) and/or suffix(es) may be added to generate new domain names. There are various ways in which the seed domain name may be obtained. According to some embodiments, the seed domain name is obtained when a user interacts with a domain name registration website, e.g., DNS registrar 320 of FIG. 3. Such a user may search for a domain name or attempt to register a domain name. The results of the user's search or the domain name that the user attempted to register, if already registered, may be selected as the seed domain name. Thus, according to some embodiments, the seed domain name is obtained from a domain name suggestion process, e.g., at a domain name registration website such as DNS registrar 320 of FIG. 3. In more detail, a user may interact with such a website by searching for a domain name, for example. The website may search for a domain name based on the user's interactions, including, but not limited to, one or more user-supplied search terms. Once the domain name suggestion process accepts the user's input(s) and identifies one or more domain names responsive to the user's interactions, the process may check whether any of the identified domain names are already registered. If so, according to some embodiments, the registered domain name(s) may be supplied to method 200 per block 206 as the seed domain name(s). According to some embodiments, the identified domain name(s) are supplied to method 200 per block 206 as the seed domain name(s) regardless as to whether they are registered or not. Other techniques for obtaining a seed domain name are also possible, not limited to the specifically-disclosed examples presented herein. After the actions of block 206, control passes to block 208.

At block 208, method 200 identifies a topic and/or a business type associated with the seed domain name. There are several ways that this may be accomplished. According to some embodiments, because the seed domain name may be registered, the actions of this block may include crawling to the website hosted at the domain name and extracting metadata to determine the topic and/or business type.

According to some embodiments, the user may be queried as to the topic and/or business type of the seed domain name. The user may interact with a user interface present on a domain name registration website (e.g., hosted by a registrar). The user may select the topic and/or business type from a drop-down menu or list with radio buttons, for example. Alternately, or in addition, the user may enter topic and/or business type information into a free-form field. Thus, in such embodiments, the user him or herself may identify the topic and/or business type.

According to some embodiments, a machine learning algorithm may be used to train a classifier model to classify the seed domain name. The machine learning algorithm may be a neural network, e.g., a feed-forward neural network, recurrent neural network, long-short term memory neural network, or convolutional neural network. The algorithm may be trained using the plurality of corpuses of categorized domain names obtained per block 202. The domain names in each set may be labeled according to their category (or categories, for topic and business type pair). The labeled domain names may then be used to train the machine learning algorithm, to generate a classification model. The classification model may be applied to the seed domain name to discern its category (or categories). For example, similar to the language models, the classifier model may classify a domain name by predicting the next character after its last character, and then classifying the domain name according to the predicted label character.

Note that some models output probabilities of the seed domain name being in each category, e.g., 60% likely to be a personal website directed to food, and 40% likely to be a blog directed to exercise. These fractional probabilities may be used later at block 210 according to some embodiments.

After the actions of block 208, control passes to block 210.

At block 210, method 200 applies a respective model (or, for some embodiments, more than one model) to the seed domain name. The respective model(s) may be determined according to the topic and/or business type information identified at block 208. That is, the model(s) trained using a learning corpus of domain names that match the topic and/or business type information identified at block 208 is applied at block 210 to the seed domain name of block 206. In other words, of the models trained per block 204, a model that was trained using a corpus of domain names that relate to or concern the same topic and/or business type determined at block 208 is selected at this block, and then applied to the seed domain name of block 206 as disclosed below.

Note that, according to some embodiments, multiple topics and/or business types may be associated with the seed domain name at block 208. Such embodiments may use a machine learning classifier model, as described above in reference to block 208. Such a classifier may output, or utilize, a plurality of probabilities regarding the likelihood that the seed domain name relates to or concerns respective topics and/or business types. (According to typical operation of such classifiers, the seed domain name would be classified in the topic and/or business type having the highest probability.) The actions of this block may apply a plurality of models to the seed domain name to generate domain name suggestions. In such embodiments, the models may be applied in proportion to the likelihoods. For example, if the classifier model outputs that the seed domain name has a 60% likelihood of being a personal website directed to food, and a 40% likelihood of being a blog directed to exercise, then method 200 may be applied such that 60% of the domain names presented to the user relate to or concern personal websites directed to food, and 40% of the domain names presented to the user relate to or concern blogs directed to exercise.

Note that, according to some embodiments, a pair (or more) of models may be selected per this block, namely, a forward model (for adding suffixes) and a backward model (for adding prefixes). Both models may be selected according to the topic(s) and/or business type(s) of the seed domain name. That is, both the forward and backward models may be trained using the corpus of training domain names that relate to or concern the data identified per block 208, with adjustments made to the training corpus as needed (e.g., formatting the learning corpus domain names backwards for the backward model).

Once the model (or models) is selected, it is (or they are) applied to the seed domain name. Applying the model(s) may take various forms. The models may be applied to generate new domain names by adding suffixes, prefixes, or both suffixes and prefixes, to the seed domain name. For example, to add a suffix, a forward model may be applied to the seed domain name and required to predict the most probable next letter, which is appended to the seed domain name. Used successively, this process constructs a new domain name from the seed domain name, by incrementally appending characters, until the most likely next character is the stop character, as described above in reference to block 202. The resultant domain name may be submitted to a reverse model to add a prefix, or passed to the process of block 212, possibly together with other generated domain names.

Note that additional new domain names may be generated by priming a respective language model with a single character added to the end or beginning of the seed domain name. Such a priming character may be randomly selected, e.g., consistent with a probability distribution observed in the original learning corpus, for example. The remaining domain name generation process is essentially the same as the non-primed case: additional characters are successively added until the stop character becomes the most probable, and then a suffix may be optionally added if a prefix was just added (and vice-versa).

The models may be applied in proportion to the identified topic(s) and/or business type(s) identified per block 208.

After the actions of block 210, the resultant generated domain name suggestions may be held in memory or persistent storage, and control passes to block 212.

At block 212, method 200 outputs the generated domain name suggestions. The generated domain name suggestions may be output in a variety of ways. According to some embodiments, the generated domain name suggestions are output by being displayed on a computer monitor. According to some embodiments, the generated domain name suggestions are output by being emailed to a selected email address. According to some embodiments, the generated domain name suggestions are output by presenting them to a user for registration. Such embodiments may be implemented by, or in coordination with a registrar or registry, which can implement the registration process. Such embodiments may present the user with a graphical user interface on a web page by which the user may select a particular domain name from the generated domain name suggestions and register it using the same interface. The registration may be accomplished using standard domain name registration techniques.

FIG. 3 is a schematic diagram of a system 300 suitable for implementing methods according to some embodiments. System 300 may be based around an electronic hardware internet server computer 306, which may be communicatively coupled to the internet 304. Server computer 306 includes network interface 308 to effect the communicative coupling to the internet 304. Network interface 308 may include a physical network interface, such as a network adapter. Server computer 306 may be a special-purpose computer, adapted for reliability and high-bandwidth communications. Thus, server computer 306 may be embodied in a cluster of individual hardware server computers, for example. Alternately, or in addition, server computer 306 may include redundant power supplies. Persistent memory 312 may be in a Redundant Array of Inexpensive Disk drives (RAID) configuration for added reliability, and volatile memory 314 may be or include Error-Correcting Code (ECC) memory hardware devices. Server computer 306 further includes one or more electronic processors 310, which may be multi-core processors suitable for handling large amounts of information. Electronic processors 310 are communicatively coupled to persistent memory 312, and may execute instructions stored thereon to effectuate the techniques disclosed herein, e.g., method 200 as shown and described in reference to FIG. 2. Electronic processors 310 are also communicatively coupled to volatile memory 314.

Server computer 306 is communicatively coupled to DNS registry 302 and/or DNS registrar 320 according to some embodiments. According to some embodiments, server computer 306 is provided by a registrar or registry for implementation of the disclosed method. According to some embodiments, DNS registry 302 or DNS registrar 320 may include server computer 306. The communication between server computer 306 and DNS registry 302 or DNS registrar 320 allows for determining whether generated domain names are currently registered, and also permits users to register unregistered domain names as disclosed herein. Server computer 306 may have an associated web page that presents a user interface to users to effectuate searching for and registering a domain name. Alternately, or in addition, server computer 306 may include an application program interface (API) suite of tools permitting users to interact with server computer 306 to perform any of the disclosed techniques.

Disclosed embodiments have many advantages and variations. Embodiments are superior to domain name generation techniques that rely on a pre-defined language of words with a fixed vocabulary. Instead, some embodiments utilize per-character generation of a trained language model using deep-learning, which is not dictionary-backed.

Certain embodiments can be performed using a computer program or set of programs. The computer programs can exist in a variety of forms both active and inactive. For example, the computer programs can exist as software program(s) comprised of program instructions in source code, object code, executable code or other formats; firmware program(s), or hardware description language (HDL) files. Any of the above can be embodied on a transitory or non-transitory computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

What is claimed is:

1. A method of generating internet domain name suggestions using machine learning, the method comprising:
   obtaining, using at least one electronic processor, a plurality of sets of domain names, each set of domain names comprising domain names that concern a selected topic;
   training, using at least one electronic processor, a plurality of machine learning algorithms, each machine learning algorithm trained by a different set of domain names of the plurality of sets of domain names, whereby a plurality of trained language models is produced, each trained language model concerning a selected topic;
   obtaining a seed domain name;
   identifying, using at least one electronic processor, a primary topic that the seed domain name concerns;
   applying to the seed domain name, using at least one electronic processor, a trained language model of the plurality of trained language models that concerns the primary topic, whereby a primary proposed domain name is produced, wherein the primary proposed domain name concerns the primary topic, and wherein the primary proposed domain name comprises the seed domain name and at least one of a prefix or a suffix; and
   offering to register the primary proposed domain name.

2. The method of claim 1:
   wherein each set of domain names comprises domain names that concern a selected topic and a business type;
   wherein the training comprises training each machine learning algorithm by a different set of domain names of the plurality of sets of domain names, whereby a plurality of trained language models is produced, each trained language model concerning a selected topic and a business type;
   the method further comprising identifying a proposed business type;
   wherein the applying to the seed domain name a trained language model comprises applying to the seed domain name a trained language model that concerns the topic and that concerns the proposed business type, wherein the primary proposed domain name concerns the topic and the proposed business type.

3. The method of claim 1, further comprising appending a stop character at an end of each domain name in each of the plurality of sets of domain names prior to the training, wherein the proposed domain name comprises at least one suffix.

4. The method of claim 1, further comprising prepending a stop character at a beginning of each domain name in each of the plurality of sets of domain names prior to the training, wherein the proposed domain name comprises at least one prefix.

5. The method of claim 1, further comprising:
   obtaining a plurality of training domain names and their associated topics; and
   training a machine learning algorithm with the plurality of training domain names and their associated topics, whereby a classification model is produced;
   wherein the obtaining a plurality of sets of domain names, each set of domain names comprising domain names that concern a selected topic comprises:
      obtaining a plurality of unlabeled domain names;
      applying the classification model to the plurality of unlabeled domain names; and
      grouping the plurality of unlabeled domain names according to classification by the classification model, whereby the plurality of sets of domain names are produced.

6. The method of claim 5, wherein the plurality of unlabeled domain names comprise a Domain Name System (DNS) zone file filtered to remove at least Punycode domains.

7. The method of claim 5, wherein the obtaining a plurality of training domain names and their associated topics comprises crawling a world wide web to the plurality of training domain names and retrieving metadata representative of the associated topics.

8. The method of claim 5, wherein the identifying a primary topic that the seed domain name concerns comprises providing the seed domain name to the classification model, and obtaining the primary topic from the classification model.

9. The method of claim 8, wherein the classification model further outputs a secondary topic that the seed domain name concerns;
   the method further comprising applying to the seed domain name, using at least one electronic processor, a trained language model of the plurality of trained language models that concerns the secondary topic, whereby a secondary proposed domain name is produced, wherein the secondary proposed domain name concerns the secondary topic, and wherein the secondary proposed domain name comprises the seed domain name and at least one of a prefix or a suffix.

10. The method of claim 1, wherein the obtaining a seed domain name comprises:
providing a web page for suggesting domain names;
accepting an input from a web page visitor; and
providing the seed domain name in response to the input.

11. A system for generating internet domain name suggestions using machine learning, the system comprising:
an electronic persistent storage storing a plurality of sets of domain names, each set of domain names comprising domain names that concern a selected topic;
at least one electronic processor configured to train a plurality of machine learning algorithms, each machine learning algorithm trained by a different set of domain names of the plurality of sets of domain names, whereby a plurality of trained language models is produced, each trained language model concerning a selected topic;
at least one electronic processor configured to obtain a seed domain name;
at least one electronic processor configured to identify a primary topic that the seed domain name concerns;
at least one electronic processor configured to apply to the seed domain name a trained language model of the plurality of trained language models that concerns the primary topic, such that a primary proposed domain name is produced, wherein the primary proposed domain name concerns the primary topic, and wherein the primary proposed domain name comprises the seed domain name and at least one of a prefix or a suffix; and
at least one electronic processor configured to offer to register the primary proposed domain name.

12. The system of claim 11:
wherein each set of domain names comprises domain names that concern a selected topic and a business type;
wherein the at least one electronic processor configured to train a plurality of machine learning algorithms is further configured to train each machine learning algorithm by a different set of domain names of the plurality of sets of domain names, whereby a plurality of trained language models is produced, each trained language model concerning a selected topic and a business type;
wherein the at least one electronic processor configured to obtain a seed domain name is further configured to identify a proposed business type; and
wherein the at least one electronic processor configured to apply to the seed domain name a trained language model is further configured to apply to the seed domain name a trained language model that concerns the topic and that concerns the proposed business type, wherein the primary proposed domain name concerns the topic and the proposed business type.

13. The system of claim 11, wherein the at least one electronic processor configured to train a plurality of machine learning algorithms is further configured to append a stop character at an end of each domain name in each of the plurality of sets of domain names prior to the training, wherein the proposed domain name comprises at least one suffix.

14. The system of claim 11, wherein the at least one electronic processor configured to train a plurality of machine learning algorithms is further configured to prepend a stop character at a beginning of each domain name in each of the plurality of sets of domain names prior to the training, wherein the proposed domain name comprises at least one prefix.

15. The system of claim 11, further comprising:
an electronic persistent storage storing a plurality of training domain names and their associated topics; and
at least one electronic processor configured to train a machine learning algorithm with the plurality of training domain names and their associated topics, whereby a classification model is produced;
wherein the plurality of sets of domain names are obtained by:
obtaining a plurality of unlabeled domain names;
applying the classification model to the plurality of unlabeled domain names;
grouping the plurality of unlabeled domain names according to classification by the classification model, whereby the plurality of sets of domain names are produced; and
storing the plurality of sets of domain names in electronic persistent memory.

16. The system of claim 15, wherein the plurality of unlabeled domain names comprise names from a Domain Name System (DNS) zone file filtered to remove at least Punycode domains.

17. The system of claim 15, wherein the plurality of training domain names and their associated topics are obtained by crawling a world wide web to the plurality of training domain names and retrieving metadata representative of the associated topics.

18. The system of claim 15, wherein the at least one electronic processor configured to identify a primary topic that the seed domain name concerns is configured to apply the classification model to the seed domain name.

19. The system of claim 18, wherein the classification model is configured to output a secondary topic that the seed domain name concerns;
the system further comprising at least one electronic processor configured to apply to the seed domain name a trained language model of the plurality of trained language models that concerns the secondary topic, whereby a secondary proposed domain name is produced, wherein the secondary proposed domain name concerns the secondary topic, and wherein the secondary proposed domain name comprises the seed domain name and at least one of a prefix or a suffix.

20. The system of claim 11, further comprising a web page configured to accept an input from a web page visitor and provide the seed domain name in response to the input.

* * * * *